(12) United States Patent
Bielek et al.

(10) Patent No.: US 9,777,167 B2
(45) Date of Patent: Oct. 3, 2017

(54) LIQUID FORMULATIONS FOR COATING AND PRINTING SUBSTRATES

(75) Inventors: Yan Bielek, Cumberland, RI (US); Philip R. Emery, Barre, MA (US)

(73) Assignee: FLEXcon Company, Inc., Spencer, MA (US)

( * ) Notice: Subject to any disclaimer, the term of this patent is extended or adjusted under 35 U.S.C. 154(b) by 569 days.

(21) Appl. No.: 11/132,520

(22) Filed: May 19, 2005

(65) Prior Publication Data
US 2005/0276924 A1  Dec. 15, 2005

Related U.S. Application Data

(60) Provisional application No. 60/572,333, filed on May 19, 2004.

(51) Int. Cl.
| C09D 11/03 | (2014.01) |
| C09D 7/00 | (2006.01) |
| B82Y 30/00 | (2011.01) |
| C09D 7/12 | (2006.01) |
| C09D 11/52 | (2014.01) |
| C08L 79/08 | (2006.01) |

(52) U.S. Cl.
CPC .............. *C09D 7/002* (2013.01); *B82Y 30/00* (2013.01); *C09D 7/1291* (2013.01); *C09D 11/03* (2013.01); *C09D 11/52* (2013.01); *C08L 79/08* (2013.01)

(58) Field of Classification Search
CPC ...... C09D 7/002; C09D 7/1291; C09D 11/03; C09D 11/52; C08L 79/08
USPC ............ 516/102; 977/742; 106/31.85, 31.86; 521/72; 524/236
See application file for complete search history.

(56) References Cited

U.S. PATENT DOCUMENTS

| 2,475,053 | A | * | 7/1949 | Rumbold ................ C08C 1/065 260/DIG. 22 |
| 2,635,124 | A | * | 4/1953 | Hunter ................ C08K 5/0025 525/346 |
| 2,957,826 | A | * | 10/1960 | Martinek ...................... 508/513 |
| 3,082,108 | A | * | 3/1963 | Julius ...................... 106/287.13 |
| 3,308,078 | A | * | 3/1967 | Rogers et al. ................ 524/272 |
| 3,320,187 | A | * | 5/1967 | Burt .............................. 521/128 |
| 3,425,964 | A | * | 2/1969 | Stanley ......................... 521/128 |
| 3,684,733 | A | | 8/1972 | Bannister et al. |
| 3,880,569 | A | | 4/1975 | Bannister et al. |
| 3,901,727 | A | * | 8/1975 | Loudas ............................ 134/4 |
| 3,976,627 | A | * | 8/1976 | Morris ...................... 525/329.9 |
| 4,151,138 | A | | 4/1979 | Citrone et al. |
| 4,500,656 | A | * | 2/1985 | Rasshofer et al. ............ 521/164 |
| 5,254,159 | A | * | 10/1993 | Gundlach et al. ......... 106/31.43 |
| 5,279,652 | A | * | 1/1994 | Kaufmann et al. ........ 106/31.36 |
| 5,726,251 | A | | 3/1998 | Wilkinson et al. |
| 5,811,070 | A | * | 9/1998 | You ............................... 423/432 |
| 6,288,141 | B1 | | 9/2001 | Malhotra |
| 6,368,569 | B1 | | 4/2002 | Haddon et al. |
| 6,467,897 | B1 | * | 10/2002 | Wu et al. ...................... 347/102 |
| 6,528,613 | B1 | | 3/2003 | Bui et al. |
| 6,589,918 | B2 | * | 7/2003 | Denpo et al. ................. 508/100 |
| 7,074,310 | B2 | | 7/2006 | Smalley et al. |
| 7,161,107 | B2 | | 1/2007 | Krupke et al. |
| 7,691,294 | B2 | * | 4/2010 | Chung ..................... C09D 5/24 242/159 |
| 7,955,528 | B2 | * | 6/2011 | Chung ..................... C09D 5/24 106/31.43 |
| 2003/0101901 | A1 | * | 6/2003 | Bergemann et al. ........ 106/31.8 |
| 2005/0255031 | A1 | | 11/2005 | Jung et al. |
| 2005/0276924 | A1 | | 12/2005 | Bielek et al. |
| 2006/0045838 | A1 | | 3/2006 | Lucien Malenfant et al. |
| 2006/0054555 | A1 | | 3/2006 | Sun |
| 2006/0242741 | A1 | | 10/2006 | Krupke et al. |
| 2006/0257773 | A1 | | 11/2006 | Wong et al. |
| 2006/0278579 | A1 | | 12/2006 | Choi et al. |
| 2008/0206488 | A1 | * | 8/2008 | Chung ..................... C09D 5/24 427/596 |
| 2009/0035707 | A1 | * | 2/2009 | Wang et al. .................. 430/322 |

FOREIGN PATENT DOCUMENTS

| DE | 195 33 265 A1 * | 5/1997 |
| JP | 6166838 | 6/1994 |
| JP | 9129141 A | 5/1997 |
| WO | WO99/21927 | 5/1999 |

OTHER PUBLICATIONS

Yi-Chung Chang, "Potentiometric Titration of Free Amine and Amine Carbonate in Carbonated Monoethanolamine Solutions", Analytical Chemistry, Vol. 30, No. 6, Jun. 1958, 1095-1097.*
Carbamodithioic acid,N,N-diethyl-, ammonium salt (1:1), online @ http://www.lookchem.com/cas-211/21124-33-4.html (copyright date 2008) (downloaded Sep. 29, 2010), 2 pages.*
1H-Imidazole-5-methanol,hydrochloride (1:1), online @ http://www.lookchem.com/cas-592/592-35-8.html (copyright date 2008) (downloaded Sep. 29, 2010), 3 pages.*
Carbamic acid,N-(2-hydroxyethyl)-, phenylmethyl ester, online @ http://www.lookchem.com/cas-603/603-52-1.html (copyright date 2008) (downloaded Sep. 29, 2010), 2 pages.*
Sigma-Aldrich online catalog. Aldrich # 167398, t-butyl carbamate, (copyright 2013), online @ http://www.sigmaaldrich.com/catalog/product/aldrich/167398?lang=en&region=US# (downloaded Mar. 12, 2013), p. 1.*

(Continued)

Primary Examiner — Daniel S Metzmaier
(74) Attorney, Agent, or Firm — Gesmer Updegrove LLP

(57) ABSTRACT

A formulation for application to a substrate including a mixture of a liquid having a first viscosity and an amine-acid adduct. The mixture has a second viscosity greater than the first viscosity. The amine-acid adduct is evaporative and substantially completely removed from the mixture in a functionally dry state as applied as a deposit on the substrate. In particular, the general nature of the formulation is that of a mixture that includes a viscosity control agent, such as an amine-acid adduct that forms a carbamate, and the formulation is for use in coating or printing wherein the final coated product includes little or no viscosity control agent.

58 Claims, No Drawings

(56) References Cited

OTHER PUBLICATIONS

Robert W. Messier, Jr, Chapter 5—Adhesives, Cements, Mortars, and the Bonding Process, Joining of Materials and Structures, Amsterdam : Elsevier. 2004, pp. 227 and 238.*
Composite, Hawley's Condensed Chemical Dictionary (online Edition, 2007), 324. John Wiley & Sons, Online @ http://onlinelibrary.wiley.com/doi/10.1002/9780470114735.hawley04113/full, headword = Composite; downloaded Sep. 24, 2014), pp. 1.*
Derwent Abstract on East, week 200829, London: Derwent Publications Ltd., AN 2003-514491, CN 1412380 A, (Asahi Kagaku Kogyo KK), abstract.*
Machine Translation on Espacenet—Bibliographic data, DE 195 33 265 (A1)—May 1997, (Schaefer et al.), pp. 1-4 (1 of 1, 1-2 of 2 & 1 of 1), online @ http://worldwide.espacenet.com/?locale=EN_ep, (downloaded Jan. 13, 2016).*
Holtzclaw et al., *General Chemistry*, D.C. Heath & Co., Lexington, MA, 1984, p. 459 (3 pgs.).
Chang, Potentionmetric Tiration of Free Amine and Amine Carbonate in Carbonated Monoethanolamine Solutions, Analytical Chemistry, June 1958, pp. 1095-1097, vol. 30 No. 6.
Carbomadithioc acid, N, N-diethyl-ammonium sald (1:1), online @http://lookchem.com/cas-211/21124-33-4.html (copyright date 2008) (downloaded 9/29/20100, 2 pages.
Chattopadhyay et al., "Length Separation of Zwitterion-Functionalized Single Wall Carbon Nanotubes by GPS", J. Am. Chem. Soc., vol. 124, No. 5, 2002, pp. 728-729, American Chemical Society.
Al-Dohoudi et al., "Wet Coating Deposition of ITO Coatings on Plastic Substrates", Journal of Sol-Gel Science and Technology 26, 2003, pp. 693-697, Kluwer Academic Publishers, The Netherlands.
Sztrum et al., "Self-Assembly of Nanoparticles in Three-Dimensions: Formation of Stalagmites", J. Phys. Chem. B, 109 (14), 2005, pp. 6741-6747, American Chemical Society Publications.
K.B. Shelimov et al., "Purification of Single-Wall Carbon Nanotubes by Ultrasonically assisted Filtration," Chemical Physics Letters 282 (1998), pp. 429-434.
J. Hilding et al., "Sorption of Butane on Carbon Multiwall Nanotubes at Room Temperature," Langmuir 2001, 17, pp. 7540-7544.
Saran, N. et al., "Fabrication and Characterization of Thin Films of Single-Wall Carbon Nanotube Bundles on Flexible Plastic Substrates," J. Am. Chem. Soc. 2004, 126, pp. 4462-4463.
R. Andrews et al., "Separation of CO2 from Flue Gases by Carbon-Multiwall Carbon Nanotube Membrane", Office of Science and Technical Information, www.osti.gov, pp. 1-171, (Mar. 2001).
O.V. Pupysheva et al., "Interaction of Single-Walled Carbon Nanotubes with Alkylamines: An Ab Initio Study", Thin Solid Films 499, 2006, pp. 256-258.
N. Choi et al., "Effects of Amines on Single-Walled Carbon Nanotubes in Organic Solvents: Control of Bundle Structures,"Jpn. J. Appl. Phys. vol. 41, 2002, pp. 6264-6266.
D. Chattopadhyay et al., "A Route for Bulk Separation of Semiconducting from Metallic Single-Wall Carbon Nanotubes,"JACS Articles: American Chemical Society 2003, vol. 125, No. 11, pp. 3370-3375.
International Preliminary Report on Patentability mailed on Nov. 30, 2006 in connection with International Patent Appln. No. PCT/US2005/017683 filed on May 19, 2005.
International Search Report and Written Opinion mailed on Oct. 14, 2005 in connection with International Patent Appln. No. PCT/US2005/017683 filed on May 19, 2005.
Non-final Office Action mailed on Jun. 21, 2012 in connection with U.S. Appl. No. 12/894,526 filed on Sep. 30, 2010.
Hearing Notice U/S 14 of the Patents Act, 1970, dated Oct. 26, 2010 in connection with Indian Patent Appln. No. 6773/DELNP/2006.
Australian Examiner's First Report mailed on Aug. 23, 2007 in connection with Australian Patent Application No. 2005245950.
Japanese Office Action issued on Jun. 1, 2010 in connection with Japanese Patent Application No. 2007-527464.
Japanese Decision of Rejection issued on Apr. 26, 2011 in connection with Japanese Patent Appln. No. 2007-527464.
English Translation of the Japanese Office Action issued on Sep. 18, 2012 in connection with Japanese Patent Application Serial No. 2007-527464.
Korean Office Action issued on Dec. 1, 2007 in connection with Korean Patent Application No. 10-2006-7026631.
Australian Examiner's Second Report mailed on Apr. 24, 2008 in connection with Australian Patent Application No. 2005245950.
1H-Imidazole-5-methanol, hydrochloride (1:1), online @ http://www.lookchem.com/cas-32673-41-9.html (copyright date 2008) (downloaded Sep. 30, 2010) 3 pages.
Carbamic acid, N-(2-hydroxyethyl)-, phenlmethyl ester, online @ http://www.lookchem.com/cas-77987-49-6.html (copyright date 2008) (downloaded Sep. 30, 2010) 2 pages.
Partial English Translation of Japanese Notice of Rejection issued on Jan. 15, 2013 in connection with Japanese Patent Application No. 2007-527464, 3 pages.
English Translation of Japanese Notice of Rejection issued on Aug. 27, 2013 in connection with Japanese Patent Appln. No. 2011-181538, 2 pages.
Office Action issued by the Japanese Patent Office on Jun. 30, 2015 in related Japanese Patent Application No. 2011-181538 and English translation thereof, 4 pages.
Office Action and Translation from Japanese Patent Office issued in related Japanese Patent Application 2011-181538 dated Oct. 17, 2014.

* cited by examiner

LIQUID FORMULATIONS FOR COATING AND PRINTING SUBSTRATES

CROSS REFERENCE TO RELATED APPLICATIONS

This application claims priority from Provisional Patent Application No. 60/572,333 filed May 19, 2004.

BACKGROUND OF THE INVENTION

1. Field of the Invention

This invention relates generally to liquid formulations designed for application to substrates as coatings, printed patterns or the like, and is concerned in particular with a formulation comprising a mixture of a liquid and volatile viscosity altering components, the latter being substantially completely evaporative when the mixture is applied to a substrate and processed to its functionally dried state.

2. Description of the Prior Art

There are solutions and dispersions, which are used as coatings or printing inks that are best applied from a very dilute state, such as in a water or non-aqueous medium. In many cases, however, the rheology of these coatings or inks may cause them to flow too freely to allow for proper control of the amount of their application. Further, if discreetly applied, they may flow too freely to maintain their target positions.

There exists an abundance of rheology control agents, commonly referred to as "thickening agents", which can be incorporated in the continuous liquid phase of a system to modify its viscosity to an appropriate level (i.e. one which meets the requirements of the application method). Unfortunately, when used in systems which are subsequently dried, the thickening agent left behind is often of a high enough concentration to adversely affect the performance of the coating or printing.

The printing of conductive inks and the application of optical coatings are two non-limiting examples where this dichotomy exists between the requirement of elevated viscosity for application purposes and purity in the functionally dried state. The dielectric properties of residual thickening agents can disadvantageously reduce the conductivity of conductive ink deposits, and the opacity of such residual thickening agents can introduce haze that adversely affects the desired clarity of optical coatings.

A need exists, therefore, for coating and ink formulations having rheologies that have been adjusted by the incorporation of thickening agents to achieve viscosities appropriate for the intended application modes, with the thickening agents being substantially completely removed from the resulting coating or ink deposits in their functionally dried states as applied to the substrates.

As herein employed, "functionally dried state" means that the volatile components of a liquid mixture have been evaporated to an extent sufficient to place the mixture in condition for its intended use.

Again, as herein employed, a component of a liquid mixture is considered to have been "substantially completely removed" when any residue of the component does not prevent the mixture, when in its functionally dried state, from performing its intended use.

SUMMARY OF THE INVENTION

In accordance with the present invention, a formulation for application to a substrate as a coating or printed deposit comprises a mixture of a liquid having a first viscosity and an amine-acid adduct in an amount appropriate to the liquid and the intended use of the mixture, preferably greater than 10% by weight of the mixture. The mixture has a second viscosity greater than the first viscosity. The amine-acid adduct is substantially completely removed by evaporation in the course of applying the mixture to a substrate and processing it to its functionally dried state. The residue of the amine-acid adduct can be as low as 0.2%, typically less than about 0.1%, preferably less than 0.01%, and most preferably less than 0.001% by weight of the thus applied and processed mixture.

DETAILED DESCRIPTION

The present invention employs the amine carbamate as a viscosity control agent for a range of solutions/dispersions from hydrocarbons to alcohols to water. Primary and secondary amines are candidates; tertiary amines are not useful.

The amines, when treated with $CO_2$, form the amine carbamate (and with water can form the amine carbonate). This zwitter ion salt formed can, as is the case of fatty acid esters and salts, be used to alter the rheology of a liquid in which such salts are compatible.

The use of amines, especially those that have a boiling point at about the temperature of that of the solvent or the continuous phase of a liquid mixture, allows the carbamate (carbonate) to break down (release $CO_2$) and the amine to evaporate off with the other volatile components of the mixture. In the course of applying the mixture to a substrate and processing it to its functionally dried state, the carbamate (carbonate) is substantially completely removed, with any residue being as low as 0.2%, typically less than 0.1%, preferably less than 0.01%, and most preferably less than 0.001% by weight of the thus applied and processed mixture.

Applications where this type of rheology control is advantageous include, for example:

(a) Nanotechnology, where the elements being coated are often in very dilute concentration, but the coatings need a higher viscosity to allow even placement. This is of particular interest when dealing with carbon nanotubes, where viscosity control not only facilitates application, but also has a stabilizing effect in preventing the nanotubes from entangling in the carrier liquid, thus agglomerating and falling out of the carrier liquid before coating, discrete coating, or printing.

(b) The application of optical coatings, e.g., for film based vision driven user interfaces (displays, touchscreens), clear protective coatings for graphics, etc., where clarity of the functionally dried deposit is a prime requirement.

(c) Other contamination-sensitive coatings that are used in electronic product fabrication. For example, use of "ink jet" type of coatings (printing) used in placement of resist coatings; or adhesion treatments for discrete placement of conductive elements in a circuit.

In the following examples, liquid mixtures were prepared using one or more of the following components:

CNT Ink Concentrate (3000 ppm CNT) obtained from Eikos in Franklin, Mass.

Solvent Ink Concentrate #7633-41P obtained from Raffi & Swanson in Wilmington, Mass.

Diluting Acrylate IBOA (Isobornyl Acrylate) obtained from Surface Specialties UCB in Smyrna, Ga.
UV Coating ECX 4019 obtained from Cognis Corporation in Ambler, Pa.

Example 1

| Conductive Ink | | |
|---|---|---|
| WB Carbamate: | | |
| | sec-Butyl Amine | 90 grams |
| | Water | 10 grams |
| | $CO_2$ | Bubble through until viscosity 11,500-12,500 cP |
| CNT Ink Formula: | | |
| | CNT Ink Concentrate (3000 ppm CNT) | 1% |
| | Water | 21% |
| | Solvent (IPA) | 50% |
| | Carbamate | 28% |
| | | 100% |

Starting viscosity of ink concentrate 30-100 cP
Final viscosity of mixture 1500-2000 cP

Example 2

| Optical Coating | | |
|---|---|---|
| Carbamate: | | |
| | n-Butyl Amine | 50 grams |
| | Solvent | 50 grams |
| | $CO_2$ | Bubble through until viscosity 10,000 cP |
| Solvent Ink Formula: | | |
| | Solvent Ink Concentrate | 10% |
| | Solvent | 70% |
| | Carbamate | 20% |
| | | 100% |

Starting viscosity of concentrate 100-200 cP
Final viscosity of mixture 1000-1200 cP

Example 3

| Optical Coating | | |
|---|---|---|
| Carbamate: | | |
| | n-Propyl Amine | 20 grams |
| | Diluting Acrylate | 80 grams |
| | $CO_2$ | Bubble through until viscosity 10,000 cP |
| UV Coating Formula: | | |
| | UV Coating | 79% |
| | Carbamate | 21% |
| | | 100% |

Starting viscosity of UV coating 200-250 cP
Final viscosity of mixture 1500-1800 cP The mixtures of Examples 1-3 were applied to a clear polyester film using a Meyer drawdown rod and processed to their functionally dried state in a laboratory oven at 70° C. for one minute. The resulting dried deposits were tested for residual carbamate components using a pHydrion Insta-Check Surface pH Pencil (available from VWR International of West Chester, Pa., U.S.A.). In each case, the pH reading ranged between 5 and 6.

Based on the definition of pH (the chemical fact that pH is the negative logarithmic function of the concentration of the hydrogen ion, written as the equation pH=-log [H⁺] from Holtzclaw et. al. *General Chemistry*, p. 459, 1984, D. C, Heath and Co., Lexington, Mass.), the higher the concentration of the hydrogen ion, the lower the pH. Any residual amine component of the carbamates would decrease the hydrogen ion concentration and thereby increase the pH as measured in this test.

Using this method of calculation, and based on the pH readings recited above, the residual carbamate concentrations in the functionally dried residues of Examples 1-3 were determined to be in the range of $7.3 \times 10^{-6}$%. To the extent present at such reduced levels, any residual carbamate was observed to have no significant adverse impact on the conductivity of the ink of Example 1, or on the clarity of the coatings of Examples 2 and 3.

Zwitter ion adducts of amines can be formed with materials other than $CO_2$. Carbon disulfide ($CS_2$) also forms stable amine salts, as do hydrogen chloride (HCl) and low boiling temperature organic acids (e.g. acetic acid, formic acid, propionic acid). However, $CO_2$ has the advantage of being of minimal toxicity and is a relatively weak acid, which may be a benefit to some of the coatings being treated.

Another advantage is that few amine carbamates/carbonates are stable much above 100° C. Thus a $CO_2$-based adduct, being easier to break down, has an excellent overall fugitive property.

As an alternative to making an amine adduct and then adding the adduct to a coating (or printing) system, the amine may be added directly to the coating, followed by addition of the $CO_2$, $CS_2$, etc. so as to form the amine adduct in-situ. In all cases, upon drying, the amine carbamate would decarboxylate, and then the amine could be driven off. The temperature needed would depend on the amine and whether or not the regenerated amine was needed to play a roll in maintaining coating "wet out" during the drying process.

The printed or coated mixtures of the present invention may be dried to their functionally dried state by various methods, e.g., thermal drying, air drying, infrared drying, microwave drying and vacuum drying.

Amines useful in the present invention may be selected from the group listed below in Table 1.

TABLE 1

| Amine | B.P. ° C. |
|---|---|
| Morpholine | 129 |
| N-ethyl-n-butyl amine | 91 |
| n-butyl amine | 78 |
| sec-butyl amine | 63 |
| t-butyl amine | 46 |
| n-propyl amine | 48 |
| n-pentyl amine | 104 |
| di-n-butylamine | 129 |
| N-methyl-n-butylamine | 91 |
| Ethylene diamine | 117 |
| AMP (2 amino-2-methyl-1-propanol) | 166 |
| DMEA (dimethyl, ethanol amine) | 135 |

We claim:

1. An ink or liquid formulation for application to a substrate, said liquid formulation comprising a liquid mixture of:
   a continuous phase of a zwitter ion adduct, and
   a material having a first viscosity to be deposited onto the substrate, wherein the mixture has a second viscosity that is suitable for use in a liquid application method and wherein the second viscosity is higher than the first viscosity, wherein said continuous phase zwitter ion adduct includes an evaporative component such that the continuous phase zwitter ion adduct is substantially completely removed from said mixture when applied to the substrate and in a functionally dried state such that the material to be deposited remains on the substrate with no measurable remnant of the continuous phase zwitter ion adduct, and wherein the material is a conductive ink, an optical coating, or a dilute dispersion of carbon nanotubes.

2. The ink or coating formulation as claimed in claim 1, wherein said formulation includes less than about 0.1% zwitter ion adduct by weight when substantially evaporated.

3. The ink or coating formulation as claimed in claim 1, wherein said formulation includes less than about 0.01% zwitter ion adduct by weight when substantially evaporated.

4. The liquid formulation as claimed in claim 1, wherein said evaporative zwitter ion adduct further includes a diluting acrylate.

5. The ink or coating formulation as claimed in claim 1, wherein the zwitter ion adduct has a boiling point at about the temperature of the continuous phase of the liquid mixture.

6. The ink or coating formulation as claimed in claim 1, wherein the liquid mixture comprises a hydrocarbon, water, or an alcohol.

7. The ink or coating formulation as claimed in claim 1, wherein the zwitter ion adduct is a carbamate or the carbonate and wherein the carbamate or the carbonate is a viscosity control agent that alters the first viscosity of the liquid.

8. The ink or coating formulation of claim 1, wherein the evaporative zwitter ion adduct includes an amine.

9. The ink or coating formulation of claim 8, wherein the amine is a primary or secondary amine.

10. The ink or coating formulation of claim 8, wherein the amine is selected from the group consisting of morpholine, N-ethyl-n-butylamine, n-butylamine, sec-butylamine, t-butylamine, n-propylamine, n-pentylamine, di-n-butylamine, N-methyl-n-butylamine, ethylene diamine, 2-amino-2-methyl-1-propanol and dimethylethanolamine.

11. The ink or coating formulation of claim 8, wherein the amine is a butyl amine.

12. The ink or coating formulation of claim 8, wherein the amine is a propyl amine.

13. The ink or coating formulation of claim 1, wherein the evaporative zwitter ion adduct includes carbon dioxide ($CO_2$).

14. The ink or coating formulation of claim 1, wherein the evaporative zwitter ion adduct includes one of: carbon disulfide ($CS_2$), hydrochloric acid (HCL), or a low boiling temperature organic acid.

15. The ink or coating formulation of claim 14, wherein the low boiling temperature organic acid is one of: acetic acid, formic acid, or propionic acid.

16. An ink or coating formulation for application to a substrate, said formulation comprising a mixture of:
   a liquid including carbon nanotubes and having a first viscosity, and
   an evaporative zwitter ion adduct that includes amine, wherein the ink or coating formulation in liquid form has a second viscosity that is greater than said first viscosity, and in a functionally dried state the zwitter ion adduct is substantially evaporated from the ink or coating formulation that is applied to the substrate.

17. The ink or coating formulation as claimed in claim 16, wherein said formulation includes less than about 0.1% zwitter ion adduct by weight when substantially evaporated.

18. The ink or coating formulation as claimed in claim 16, wherein said evaporative zwitter ion adduct further includes a diluting acrylate.

19. The ink or coating formulation as claimed in claim 16, wherein said formulation includes less than about 0.01% zwitter ion adduct by weight when substantially evaporated.

20. The ink or coating formulation as claimed in claim 16, wherein the mixture comprises zwitter ion adduct of greater than 10% by weight of the mixture.

21. The ink or coating formulation as claimed in claim 16, wherein the liquid comprises a hydrocarbon, water, or an alcohol.

22. The ink or coating formulation as claimed in claim 16, wherein the mixture comprises a volatile component such that the zwitter ion adduct is substantially evaporated from the ink or coating formulation in a functionally dried state.

23. The ink or coating formulation as claimed in claim 16, wherein the zwitter ion adduct is a carbamate or the carbonate and wherein the carbamate or the carbonate is a viscosity control agent that alters the first viscosity of the liquid.

24. The ink or coating formulation of claim 16, wherein the amine is a primary or secondary amine.

25. The ink or coating formulation of claim 16, wherein the amine is selected from the group consisting of morpholine, N-ethyl-n-butylamine, n-butylamine, sec-butylamine, t-butylamine, n-propylamine, n-pentylamine, di-n-butylamine, N-methyl-n-butylamine, ethylene diamine, 2-amino-2-methyl-1-propanol and dimethylethanolamine.

26. The ink or coating formulation of claim 16, wherein the amine is a butyl amine.

27. The ink or coating formulation of claim 16, wherein the amine is a propyl amine.

28. The ink or coating formulation of claim 16, wherein the evaporative zwitter ion adduct further includes carbon dioxide ($CO_2$).

29. The ink or coating formulation of claim 16, wherein the evaporative zwitter ion adduct further includes one of: carbon disulfide ($CS_2$), hydrochloric acid (HCL), or a low boiling temperature organic acid.

30. The ink or coating formulation of claim 29, wherein the low boiling temperature organic acid is one of: acetic acid, formic acid, or propionic acid.

31. A conductive ink or coating formulation for application to a substrate, said formulation comprising a mixture of:
   a liquid including a conductive ink material and having a first viscosity, and
   an evaporative zwitter ion adduct that includes amine, wherein
   the conductive ink or coating formulation in liquid form has a second viscosity that is greater than said first viscosity, and in a functionally dried state the zwitter ion adduct is substantially evaporated from the ink or coating formulation that is applied to the substrate.

32. The ink or coating formulation as claimed in claim 31, wherein said evaporative zwitter ion adduct further includes a diluting acrylate.

33. The ink or coating formulation as claimed in claim 31, wherein said formulation includes less than about 0.1% zwitter ion adduct by weight when substantially evaporated.

34. The ink or coating formulation as claimed in claim 31, wherein said formulation includes less than about 0.01% zwitter ion adduct by weight when substantially evaporated.

35. The conductive ink or coating formulation as claimed in claim 31, wherein the liquid comprises a hydrocarbon, water, or an alcohol.

36. The conductive ink or coating formulation as claimed in claim 31, wherein the mixture comprises a volatile component such that the zwitter ion adduct is substantially evaporated from the ink or coating formulation in a functionally dried state.

37. The conductive ink or coating formulation as claimed in claim 31, wherein the zwitter ion adduct is a carbamate or the carbonate and wherein the carbamate or the carbonate is a viscosity control agent that alters the first viscosity of the liquid.

38. The conductive ink or coating formulation of claim 31, wherein the amine is a primary or secondary amine.

39. The conductive ink or coating formulation of claim 31, wherein the amine is selected from the group consisting of morpholine, N-ethyl-n-butylamine, n-butylamine, sec-butylamine, t-butylamine, n-propylamine, n-pentylamine, di-n-butylamine, N-methyl-n-butylamine, ethylene diamine, 2-amino-2-methyl-1-propanol and dimethylethanolamine.

40. The conductive ink or coating formulation of claim 31, wherein the amine is a butyl amine.

41. The conductive ink or coating formulation of claim 31, wherein the amine is a propyl amine.

42. The conductive ink or coating formulation of claim 31, wherein the evaporative zwitter ion adduct further includes carbon dioxide ($CO_2$).

43. The conductive ink or coating formulation of claim 31, wherein the evaporative zwitter ion adduct further includes one of: carbon disulfide ($CS_2$), hydrochloric acid (HCL), or a low boiling temperature organic acid.

44. The conductive ink or coating formulation of claim 43, wherein the low boiling temperature organic acid is one of: acetic acid, formic acid, or propionic acid.

45. An optical ink or coating formulation for application to a substrate, said formulation comprising a mixture of:
a liquid including an optical coating material and having a first viscosity, and an evaporative zwitter ion adduct that includes amine, wherein the optical ink or coating formulation in liquid form has a second viscosity that is greater than said first viscosity, and in a functionally dried state the zwitter ion adduct is substantially evaporated from the ink or coating formulation that is applied to the substrate.

46. The optical ink or coating formulation as claimed in claim 45, wherein the liquid comprises a hydrocarbon, water, or an alcohol.

47. The optical ink or coating formulation as claimed in claim 45, wherein the mixture comprises a volatile component such that the zwitter ion adduct is substantially evaporated from the ink or coating formulation in a functionally dried state.

48. The optical ink or coating formulation as claimed in claim 45, wherein the zwitter ion adduct is a carbamate or the carbonate and wherein the carbamate or the carbonate is a viscosity control agent that alters the first viscosity of the liquid.

49. The optical ink or coating formulation as claimed in claim 45, wherein said evaporative zwitter ion adduct further includes a diluting acrylate.

50. The optical ink or coating formulation as claimed in claim 45, wherein said formulation includes less than about 0.1% zwitter ion adduct by weight when substantially evaporated.

51. The optical ink or coating formulation as claimed in claim 45, wherein said formulation includes less than about 0.01% zwitter ion adduct by weight when substantially evaporated.

52. The optical ink or coating formulation of claim 45, wherein the amine is a primary or secondary amine.

53. The optical ink or coating formulation of claim 45 wherein the amine is selected from the group consisting of morpholine, N-ethyl-n-butylamine, n-butylamine, sec-butylamine, t-butylamine, n-propylamine, n-pentylamine, di-n-butylamine, N-methyl-n-butylamine, ethylene diamine, 2-amino-2-methyl-1-propanol and dimethylethanolamine.

54. The optical ink or coating formulation of claim 45, wherein the amine is a butyl amine.

55. The optical ink or coating formulation of claim 45, wherein the amine is a propyl amine.

56. The optical ink or coating formulation of claim 45, wherein the evaporative zwitter ion adduct further includes carbon dioxide ($CO_2$).

57. The optical ink or coating formulation of claim 45, wherein the evaporative zwitter ion adduct further includes one of: carbon disulfide ($CS_2$), hydrochloric acid (HCL), or a low boiling temperature organic acid.

58. The optical ink or coating formulation of claim 57, wherein the low boiling temperature organic acid is one of: acetic acid, formic acid, or propionic acid.

* * * * *